United States Patent [19]
Korevaar et al.

[11] Patent Number: 6,141,128
[45] Date of Patent: Oct. 31, 2000

[54] BUFFERED LASER COMMUNICATION LINK

[75] Inventors: Eric J. Korevaar; Prasanna Adhikari, both of San Diego, Calif.

[73] Assignee: Astroterra Corporation, San Diego, Calif.

[21] Appl. No.: 08/990,850

[22] Filed: Dec. 15, 1997

[51] Int. Cl.[7] .......................... H04B 10/00; H04B 10/10; H04B 10/08

[52] U.S. Cl. .......................... 359/152; 359/110; 359/153

[58] Field of Search ..................... 359/110, 153, 359/187, 161, 152

[56] References Cited

U.S. PATENT DOCUMENTS

| | | | |
|---|---|---|---|
| 3,488,586 | 1/1970 | Watrous et al. | |
| 3,794,841 | 2/1974 | Cosentino et al. | |
| 5,229,593 | 7/1993 | Cato | 250/205 |
| 5,416,627 | 5/1995 | Wilmoth | |
| 5,526,161 | 6/1996 | Suzuki et al. | |
| 5,822,099 | 10/1998 | Takamatsu | 359/153 |
| 5,905,585 | 5/1999 | Shirai | 359/110 |

FOREIGN PATENT DOCUMENTS

| | | | |
|---|---|---|---|
| 2716788 | 10/1978 | Germany | 359/110 |
| 3314869 | 10/1984 | Germany | 359/110 |
| 2195508 | 4/1988 | United Kingdom | 359/110 |

OTHER PUBLICATIONS

Bruno, W. M.; Mangual, R.; and Zampolin, R.F.; *Diode Laser Spatial Diversity Trasmitter*, TRW Space & Technology Group, One Space Park, Redondo Beach, California, 90278, SPIE vol. 1044, *Optomechanical Design of Laser Transmitters and Receivers* (1989).

Korevaar, Eric; Schuster, John; AstroTerra Corporation, 11659 Sorrento Valley Rd., Suite A, San Diego, CA 92121; and Bloom, Scott; Chan, Victor; Chen, Irene; Foster, Cary; Liu, C.S.; Low, Amy; Rivers, Mike; Slatnick, Kevin; ThermoTrex Corporation, 9550 Distribution Ave., San Diego, CA 92121; Status of BMDO/IST *Lasercom Advanced Technology Demonstration*, SPIE vol. 2123, Jan., 1994.

Korevaar, E.; Bloom, S.;Slatnick, K.; Chan V.; Chen, I; Rivers, M.; Foster, C.; Choi, K.; Liu, C.S.; ThermoTrex Corporation, 9550 Distribution Avenue, San Diego, CA 92121; *Status of SDIO/IS&T Lasercom Testbed Program*, SPIE, vol. 1866; *Free–Space Laser Communication Technologies V*, Jan., 1993, Los Angeles, California.

(List continued on next page.)

*Primary Examiner*—Leslie Pascal
*Assistant Examiner*—Agustin Bello
*Attorney, Agent, or Firm*—Nydegger & Associates

[57] ABSTRACT

A transceiver for a two-way laser beam link in a communications system handles data blocks and stand-down blocks on both in-coming and out-going laser beams. The transceiver includes a detector unit which monitors the in-coming laser beam, and sends an interrupt signal on its out-going beam whenever the quality of the in-coming beam passes a predetermined threshold. Additionally, the transceiver includes an injector for inserting stand-down blocks onto its out-going beam in response to interrupt signals that are received on its in-coming beam. A router is provided at the transceiver for removing stand-down blocks from its in-coming beam. Appropriate buffers are provided at the transceiver so that laser transmissions with other transceivers can be made at a baud rate which is approximately twice as fast as the data signaling rate used on non-laser connections between each transceiver and other components of the system.

17 Claims, 1 Drawing Sheet

OTHER PUBLICATIONS

Korevaar, Eric; Hofmeister, R.J.; Schuster, J.; Chow–Miller, C.; Adhikari, P.; Hakakha, H.; Cuthbert, D; Ruigrok, R.; Astroterra Corporation, 11526 Sorrento Valley Rd., Suite V, San Diego, CA 92121; *Design of Satellite Terminal for BMDO Lasercom Technology Demonstration*, SPIE vol. 2381, *Free–Space Laser Communication Technologies VII*, Feb., 1995, San Jose, California.

Schuster, John; Hakakha, Harel; and Korevaar, Eric; Astro–Terra Corporation, 11526 Sorrento Valley Rd., Suite V, San Diego, CA 92121; *Optomechanical Design of STRV–2 Lasercom Transceiver Using Novel Azimuth/Slant Gimbal*; SPIE vol. 2699; *Free–Space Laser Communication Technologies VIII*; Jan., 1996, San Jose, California.

BUFFERED LASER COMMUNICATION LINK

FIELD OF THE INVENTION

The present invention pertains generally to laser beam communications systems. More particularly, the present invention pertains to two-way communications links which can be established as part of a larger comprehensive communications system. The present invention is particularly, but not exclusively, useful as a two-way communications link which uses a buffer scheme that allows the link to idle during periods when the laser beam would otherwise be disrupted by atmospheric scintillations.

BACKGROUND OF THE INVENTION

Laser beams have been successfully used as signal carriers for information communications systems for many purposes in recent years. For example, U.S. patent application Ser. No. 08/705,515 filed Aug. 29, 1996, for an invention entitled "Multiple Transmitter Laser Link", and assigned to the same assignee as the present invention, discloses a communication system which uses laser beam signal carriers. While laser beams can be very effective when used in a communications system, like all other types of communications systems, laser beam links are susceptible to disruptions. This can happen for a number of reasons. Perhaps the most obvious cause for the disruption of a laser beam is an interfering optical obstruction which is somehow positioned in the path of the laser beam. Such obstructions can include land based objects, such as buildings or mountains, or they may be airborne phenomena such as fog, clouds, smoke or haze. The land based obstructions can largely be avoided by proper placement of the laser communications link. On the other hand, while generally unavoidable, the airborne obstructions are usually temporary. It also happens, however, that less obvious disruptions to laser beams can occur due to atmospheric scintillations even though there are no optical obstructions per se.

Atmospheric scintillations can diminish the quality of a laser beam, and potentially disrupt communications carried on the beam, in several ways. For one, temperature gradients in the atmosphere will cause inhomogeneities in the index of refraction. Also, wind gusts can produce atmospheric scintillations which cause the intensity of the laser beam to vary erratically.

The ability of a laser link to handle atmospheric scintillations can, of course, be improved by using specially engineered equipment for the purpose. All equipment, however, has an operational threshold. In the specific case of laser beam communications equipment, there is an intensity of the laser beam below which the equipment is, for all intents and purposes, ineffective. It appears that this intensity threshold will exist no matter how sophisticated the equipment may be. Thus, whenever atmospheric scintillations cause the laser beam's intensity to fall below the equipment's operational threshold, there will be "drop outs" which cause so-called "burst errors" to occur in the communications. For example, if a laser transmitter transmits at the rate of 100 Mbits/sec (1 Mbit=$10^6$ bits) a one msec (1 msec=$10^{-3}$ seconds) drop out will lose $10^5$ bits of information. This loss rate is unacceptable.

For an effective communications link it is necessary that the drop outs, or burst errors, in a laser beam communications link occur less than $10^{-9}$ of the time. (e.g. At a data rate of 100 Mb/sec, it is acceptable to have a single bit error every 10 seconds on average.) Conventionally, in order to keep drop outs below this rate, the average operational intensity of the laser beam may need to be one hundred times the magnitude of the threshold intensity below which the equipment is operationally ineffective. To satisfy these requirements several solutions have been proposed. One solution is to upgrade the equipment that is used. For instance, equipment can be upgraded to have higher laser beam intensities. Also, upgraded equipment can employ larger receivers and/or multiple transmitters. Not surprisingly, the upgrading of equipment can be extremely costly. Another solution entails forwarding error correction codes along with the communications data. Several schemes can be envisioned for this solution. The problem, however, is that effective schemes for forwarding error correction along with the communicated data require a significant increase in memory and processor power. This too costs money, or may not be practical at very high speeds.

The present invention recognizes that while drop outs, if uncompensated, can be of sufficient duration to effectively disrupt communications (e.g. 1–10 msec), they occur for only a small percentage of the time (e.g. approximately less than 20%). Further, the present invention recognizes that the data to be transmitted over the laser beam can be effectively buffered to increase the rate of data transmission across the laser link and thereby allow the transmission of all data at times when there are no drop outs.

In light of the above it is an object of the present invention to provide a laser link for a communications system which transmits all communication data over the laser link only when there is sufficient quality in the laser beam to effectively transmit the data. Another object of the present invention is to provide a laser link for a communications system which accommodates disruptions in laser beam transmission that are due to atmospheric scintillations. Still another object of the present invention is to provide a laser link for a communications system which is relatively simple to manufacture, easy to use, and comparatively cost effective.

SUMMARY OF THE PREFERRED EMBODIMENTS

A two-way communications laser link for a data communications system includes two transceivers which are distanced from each other in a line-of-sight relationship. Both transceivers have a transmitter and a companion receiver which are each capable of handling information blocks carried on laser beams. From the perspective of each transceiver, the transmitter transmits information blocks on an out-going laser beam and its companion receiver receives information blocks on an in-coming laser beam. For purposes of the present invention, individual information blocks have a duration of approximately one millisecond, and each block contains approximately one hundred thousand bits of digital information.

There are two types of information blocks used for the present invention. First, there are "data blocks" which contain the messages and/or images which are to be communicated. Second, there are "stand-down blocks" which need not contain such information and which are, instead, used as spacers when data blocks can not be effectively transmitted. Accordingly, stand-down blocks can be selectively inserted between data blocks in a data stream to effectively idle the laser link during periods when data blocks on the laser beam would otherwise be disrupted by atmospheric scintillations.

In the operation of the present invention, the receiver component of the transceiver receives information blocks on the beam that is in-coming from the other transceiver in the laser link. A detector unit, mounted with the receiver, monitors this in-coming laser beam for its quality value (e.g. the intensity of the laser beam). Whenever the quality value of the in-coming laser beam passes a predetermined threshold, the detector unit indicates an interrupt signal. The interrupt signal is then sent by the companion transmitter on its out-going beam to the receiver of the other transceiver in the link.

Whenever a transceiver receives an interrupt signal, the transmitter is directed to suspend its transmission of data blocks. Instead, an injector which is mounted with the transmitter inserts a stand-down block for transmission on the out-going laser beam. Thus, the stand-down block is transmitted in place of the next sequential data block. This process continues, with stand-down blocks being inserted into the data stream as long as interrupt signals are being generated by the detector unit. Once interrupt signals are no longer being generated, however, the transmitter resumes the transmission of data blocks.

As indicated above, the stand-down blocks do not contain data that is useful for the communication. Therefore, they need to be removed from the data stream at the receiving transceiver. To do this, a router, which is mounted with the receiver of a transceiver unit, removes stand-down blocks from the in-coming laser beam. The remaining data blocks are then reassembled in their proper sequence for communication as contiguous data blocks.

The insertion of stand-down blocks between data blocks in the data stream to idle the laser link is possible due to the use of appropriate buffers. As intended for the present invention, the transmission and reception of information blocks on respective out-going and in-coming laser beams are accomplished at an accelerated transmission rate. Specifically, transmissions on the laser beam is at a baud rate which is approximately twice the data signaling rate used for non-laser data transmissions between the transceivers and other components of the communications system.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION OF THE PREFERRED EMBODIMENT

Figure 1:
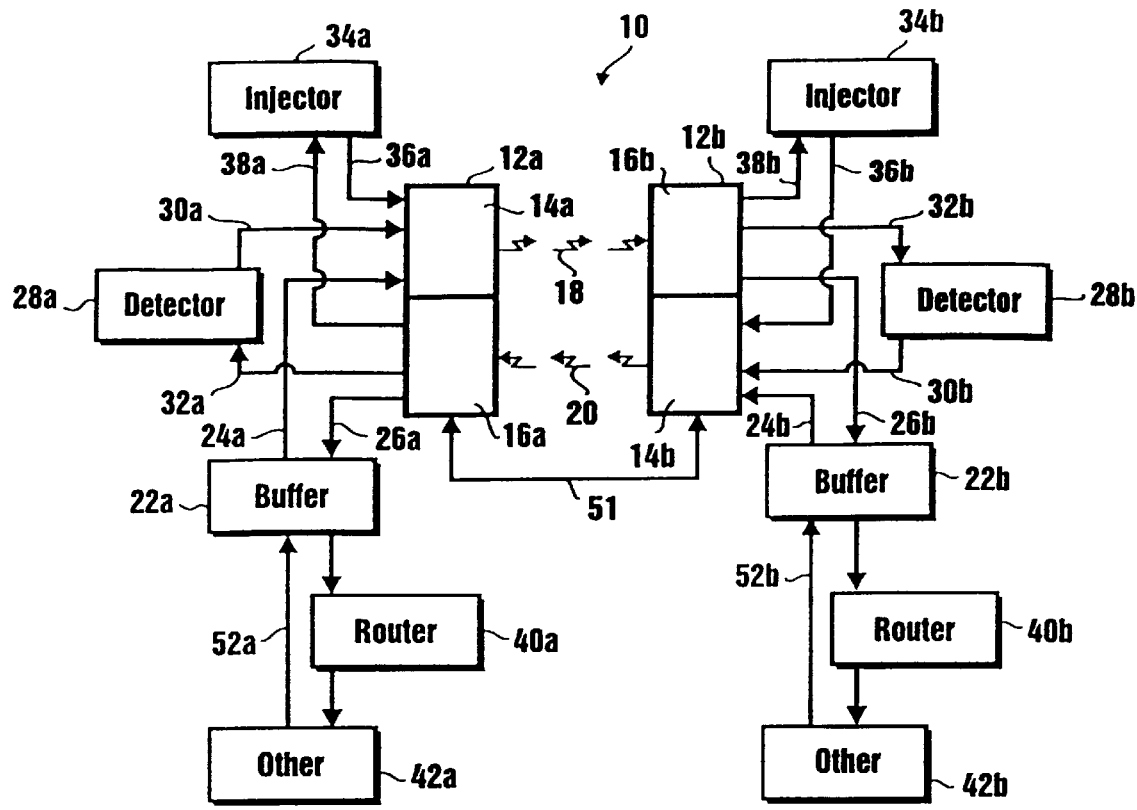
FIG. 1 is a schematic drawing of the operative components of the present invention for a two-way laser link in a communications system.

Referring initially to FIG. 1, a schematic representation of components in a communication system are shown and generally designated 10. As shown, the system 10 includes a transceiver 12a and a transceiver 12b which are distanced from each other and positioned in a line of sight relationship. For purposes of the present invention, the transceiver 12a and its associated components are essentially similar to the transceiver 12b and its associated components. Thus, each transceiver 12a and 12b has a respective transmitter 14a and 14b and a respective receiver 16a and 16b. To establish the laser link between the two transceivers 12, the transmitter 14a of transceiver 12a radiates a laser beam 18 which is received by the receiver 16b of transceiver 12b. Similarly, the transmitter 14b of transceiver 12b radiates a laser beam 20 which is received by the receiver 16a of transceiver 12a. From the perspective of the transceiver 12a, the laser beam 18 is an out-going beam and the laser beam 20 is an in-coming beam. From the perspective of the transceiver 12b the descriptions of the laser beams 18,20 are reversed. Other than the different laser beams 18, 20 which are used in this laser link, the equipment at either end of the laser communication link are quite similar.

For purposes of disclosure, consider the transceiver 12a. A buffer 22a is connected with the transceiver 12a and, more specifically, buffer 22a is connected directly with the transmitter 14a via line 24a and with the receiver 16a via line 26a. FIG. 1 also shows that a detector 28a is electronically connected with the transceiver 12a via a line 30a to transmitter 14a and via a line 32a to receiver 16a. Also electronically connected with transceiver 12a is an injector 34a. Specifically, injector 34a is connected to transmitter 14a via line 36a and to receiver 16a via line 38a. Finally, a router 40a is shown connected between the buffer 22a and other (peripheral) equipment 42a. As intended for the present invention, the other equipment 42 of system 10 can include any device, or form of software or hardware, which generates information data that is capable of being transmitted over a laser beam carrier. This information can include multimedia data such as audio signals, video signals and standard digital data. Further, it is to be appreciated that the transceiver 12b of system 10 is, in all important essentials, the same as transceiver 12a. Thus, buffer 22b, detector 28b, injector 34b and router 40b are all essentially the same as, are similarly interconnected, and are interchangeable with, their respective counterparts disclosed above in connection with transceiver 12a.

It is to be appreciated that the system 10 can also be used as a one-way communications link. If so, the link between the receiver 16a and transmitter 14b (i.e. laser beam 20) may be omitted, or the link between transmitter 14a and receiver 16b (i.e. laser beam 18) may be omitted. In either of these cases, some signal link in addition to the non-omitted laser link will be required between the transceiver 12a,b in order to coordinate their operation.

Figure 2:
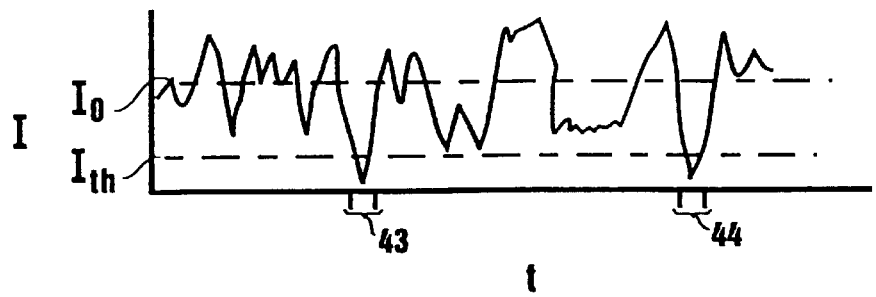
FIG. 2 is a time graph of typical intensity fluctuations in a laser beam due to atmospheric scintillations.

FIG. 2 shows a representative variation in the intensity of either of the laser beams 18 or 20 in response to atmospheric scintillations. For purposes of discussion, consider the intensity $I_0$ as being the operational intensity of the two transceivers 12a,b and $I_{th}$ as being a predetermined threshold below which the intensity of the beam is ineffective for carrying informational data. As indicated above, the intensity, I, of the laser beams 18,20 will be below $I_{TH}$, during drop outs. Importantly, this will be for less than 20% of the time. Also, the continuous length of time for any one drop out episode is typically much less than fifty milliseconds long (50 msec), and more likely around only one or two milliseconds (1 or 2 msec) in duration. For example, the time intervals 43 and 44 shown in FIG. 2 are representative of the intensity, I, of laser beams 18, 20 during drop outs. As stated above for the present invention, the system 10 is idled during such drop outs when communications data cannot be effectively transmitted.

Figure 3:
FIG. 3 is a representative data stream on the laser link with a communications scheme which, in accordance with the present invention, has been divided into data blocks and stand-down blocks.

In order to compensate for the down time caused by atmospheric scintillations (i.e. when system 10 is ineffective for transmitting data) the present invention divides its communicated signal into information blocks which may be either data blocks 46 or stand-down blocks 48. Each information block (both data block 46 and stand-down block 48) is approximately of one millisecond (1 msec) duration and contains approximately one hundred thousand ($10^5$) bits of information. For instance, the data stream 50 (shown in FIG. 3 contains both data blocks 46 with the useable information that is contained in the transmitted communication and stand-down blocks 48. As indicated above, unlike the data blocks 46, the stand-down blocks 48 do not have useable communication information, consequently, the stand-down blocks 48 merely provide an idling period during which useable information is not transmitted and, therefore, not subject to being lost.

In the operation of the laser link of communication system 10, data from other equipment 42a,b is transferred to a respective buffer 22a,b via lines 52a,b as a stream of contiguous data blocks 46 for subsequent transmission by transmitter 14. Typically, this transmission of data from other equipment 42 to the buffer 22 will be at a data signaling rate which is approximately one hundred megabits per second (100 Mb/s). As intended for the present invention, the buffer 22 is capable of holding approximately fifty information blocks (i.e. 50 blocks of $10^5$ bits each) for out-going communications. At the same time, buffer 22 is also capable of holding approximately fifty information blocks for in-coming communications.

For communications on the laser link beams 18,20, the transceivers 12a,b do not use the data signaling rate of 100 Mb/s. Instead, the respective buffers 22 send data via the lines 24a,b to the transmitters 14a,b for subsequent transmission on the laser beam 18,20 at a baud rate which is approximately two hundred megabits per second (200 Mb/s). Thus, data is transmitted between the transceivers 12 at a rate which is about twice as fast as the transmission rate used by the other equipment 42 in system 10.

During the transmission of the communications data stream 50 from the transmitting transceiver 12a,b, the receiving transceiver 12b,a monitors the data stream for its quality value. Specifically, the intensity, I, of the in-coming laser beam 18,20 is monitored by the detector unit 28a,b. Whenever the intensity, I, falls below a predetermined threshold, $I_{th}$, the detector 28a,b generates an interrupt signal. At this point, it is to be appreciated that several aspects of the in-coming laser beam 18,20 can be monitored by the detector unit 28a,b to trigger the interrupt signal. For example, the rate of change in intensity can be used instead of, or in conjunction with, the predetermined value $I_{th}$ to initiate an interrupt signal. In any event, the detector 28a,b will continue to generate interrupt signals at one-half millisecond intervals (0.5 msec) as long as the predetermined threshold is compromised. Typically, continuous uninterrupted interrupt signals need not be sent for more than one or two milliseconds (1–2 msec).

Preferably, the interrupt signals generated by the detector units 28a,b are sent from the receiving transceiver 12b,a to the transmitting transceiver 12a,b over the out-going laser beam 18,20. Upon receipt of an interrupt signal from the receiving transceiver 12b,a, the injector 34a,b of the transmitting transceiver 12a,b injects a stand-down block 48 into the data stream 50. As indicated above, such insertions continue as long as interrupt signals are received. The interrupt signals could, however, also be sent over a separate communications channel 51 between the transceivers 12a and 12b by another means such as a radio link, or a separate optical link.

As indicated in FIG. 1, the data stream 50 which is received by a receiver 16a,b is transferred via line 26a,b to the buffer 22a,b. Recall, the data stream may, or may not, include stand-down blocks 48. Regardless, the received data stream 50 is passed through the router 40a,b where all stand-down blocks 48 are removed from the data stream 50. The data blocks 46 are then reassembled as contiguous data and transferred to the other peripheral equipment 42a,b in the system 10. It will be appreciated that, in an alternate embodiment, the router 40 may remove the stand-down blocks 48 from the data stream 50 before the received data stream 50 passes through the buffer 22 a,b.

While the particular laser link for a communication system as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims. In particular, the stand down blocks could be actual data blocks which are discarded by the receiver if they contain drop outs, and retransmitted by the transmitter until the interrupt signals are no longer received. The interrupt signal need not be transmitted on the return laser link, but could use a separate transmission means such as a radio, microwave, wired, or separate optical link. The data transmitted on the laser link need not be at 2× the rate of data in the rest of the system, but could be at 1.5× or some other number greater than 1. The data rate of the overall system need not be 100 Mb/s, but could be 155 Mb/s, 622 Mb/s, or any other data rate. The transmitter and receiver could share various optics such as a telescope, or use separate optics.

What is claimed is:

1. A laser link for a communication system which comprises:

a transmitter for selectively transmitting data blocks on a laser beam, said laser beam having a quality value;

a receiver for receiving said data blocks on said laser beam;

a detector unit for monitoring said quality value of said laser beam, and for sending an interrupt signal to said transmitter to suspend transmissions of said data blocks whenever said quality value passes a predetermined threshold value;

an injector for inserting at least one stand-down block for transmission on said laser beam in response to said interrupt signal; and a router for removing said stand-down block from said data blocks.

2. A laser link as recited in claim 1 further comprising a communication channel for sending said interrupt signal.

3. A laser link as recited in claim 1 further comprising:

a buffer connected with said transmitter for obtaining data blocks from said system at a data signaling rate and, for transmitting said data blocks from said transmitter on said laser beam to said receiver at a baud rate; and a buffer connected with said receiver for receiving said data blocks on said laser beam at said baud rate and for issuing said data blocks from said receiver to said system at said data signaling rate.

4. A laser link as recited in claim 3 wherein said stand-down block is a previously sent data block.

5. A laser link as recited in claim 3 wherein said baud rate is faster than said data signaling rate.

6. A laser link as recited in claim 5 wherein said baud rate is approximately twice as fast as said data signaling rate and wherein each said data block and each said stand-down block has a duration of approximately one millisecond (1.0 msec).

7. A laser link as recited in claim 6 wherein each said data block includes approximately one hundred thousand bits of information ($10^5$ bits).

8. A laser link as recited in claim 7 wherein said bits of information are issued to said system from said receiver in a same order as said bits of information are obtained by said transmitter from said system.

9. A laser link as recited in claim 3 wherein said laser beam is a first laser beam and said device further comprises:
- a second transmitter for selectively transmitting data blocks on a second laser beam, said second laser beam having a quality value;
- a second receiver for receiving said data blocks on said second laser beam; and
- a detector unit mounted with said second receiver for monitoring said quality value of said second laser beam, and for sending an interrupt signal to said second transmitter to suspend transmissions of said data blocks when said quality value of said second laser beam passes a predetermined threshold value.

10. A laser link as recited in claim 9 further comprising:
- an injector mounted with said second transmitter for inserting at least one stand-down block for transmission on said second laser beam in response to said interrupt signal; and
- a router mounted with said second receiver for removing said stand down blocks from said data blocks.

11. A laser link as recited in claim 10 further comprising:
- a buffer connected with said second transmitter for obtaining data blocks from said system at a data signaling rate and, for transmitting said data blocks from said second transmitter on said laser beam to said second receiver at a baud rate; and
- a buffer connected with said second receiver for receiving said data blocks on said second laser beam at said baud rate and for issuing said data blocks from said second receiver to said system at said data signaling rate.

12. A transceiver comprising:
- a means for transmitting a first laser beam, said first laser beam including a plurality of data blocks and at least one stand-down block selectively inserted therebetween, said first laser beam having a quality value;
- a means for receiving a second laser beam, said second laser beam including a plurality of data blocks and at least one stand-down block selectively inserted therebetween, said second laser beam having a quality value;
- a detector unit for monitoring said quality value of said second laser beam, and for sending an interrupt signal for suspending transmissions of data blocks on said second laser beam when said quality value of said second laser beam passes a predetermined threshold value;
- an injector for inserting at least one stand-down block for transmission on said first laser beam in response to said interrupt signal;
- a buffer connected with said transmitting means for obtaining data blocks from said system at a data signaling rate and, for transmitting said data blocks from said transmitter on said first laser beam at a baud rate; and
- a buffer connected with said receiving means for receiving said data blocks on said second laser beam at said baud rate and for issuing said data blocks to said system at said data signaling rate.

13. A transceiver as recited in claim 12 wherein said interrupt signal is sent on said first laser beam.

14. A transceiver as recited in claim 12 wherein said interrupt signal is sent on a communication channel.

15. A method to compensate for atmospheric scintillations in a laser link of a communication system which comprises the steps of:
- transmitting data blocks on a laser beam from a transmitter, said laser beam having a quality value;
- receiving said data blocks on said laser beam at a receiver;
- monitoring said quality value of said laser beam;
- sending an interrupt signal to said transmitter when said quality value passes a predetermined threshold value;
- inserting a stand-down block between said data blocks for transmission on said laser beam in response to said interrupt signal; and
- removing any said stand-down block from said data blocks.

16. A method as recited in claim 15 wherein said transmitting and said receiving steps are accomplished at a baud rate, and wherein each said data block and each said stand-down block have a duration of approximately one-half millisecond (0.5 msec) during transmission on the laser link, and wherein said method further comprises the steps of:
- obtaining said data blocks from said system at a data signaling rate;
- gathering said data blocks in a transmitter buffer for subsequent transmission on said laser beam therefrom;
- holding said data blocks transmitted on said laser beam from said transmitter in a receiver buffer; and
- issuing said data blocks to said system from said receiver buffer at a data signaling rate wherein said baud rate is approximately twice as fast as said data signaling rate.

17. A method as recited in claim 16 wherein said sending step is accomplished using a communications channel.

* * * * *